Aug. 13, 1957   J. LITWIN   2,802,294
FISHING LURE
Filed April 8, 1955

INVENTOR.
John Litwin,
BY
Harry B. Cook,
ATTORNEY.

United States Patent Office 2,802,294
Patented Aug. 13, 1957

2,802,294

FISHING LURE

John Litwin, Montclair, N. J.

Application April 8, 1955, Serial No. 500,095

2 Claims. (Cl. 43—42.22)

This invention relates to fishing lures and more particularly to new and useful improvements in a fishing lure designed and adapted to be drawn through the water adjacent the surface thereof and to oscillate about its longitudinal axis so as to simulate to some extent the swimming movements of a small bait fish.

One object of the invention is to provide a lure embodying a novel construction whereby the lure can be easily and quickly adjusted by simple manual bending action to cause the lure to move in different ways or in different degrees at the choice of the fisherman.

Another object of the present invention is to provide a fishing lure with a semi-buoyant body composed of a pair of hollow chambers capable of angular relative adjustment for varying the character and extent of motion of the body when it is drawn through water.

Yet another object of the invention is to provide a fishing lure with means for preventing spinning or twisting of the lure body when being drawn through the water.

It is further proposed to provide a fishing lure that is simple and durable in construction, economical to manufacture and highly efficient for the purpose intended.

Other objects and advantages of the invention will be apparent from the description thereof to follow taken in conjunction with the accompanying drawing in which—

Figure 1:
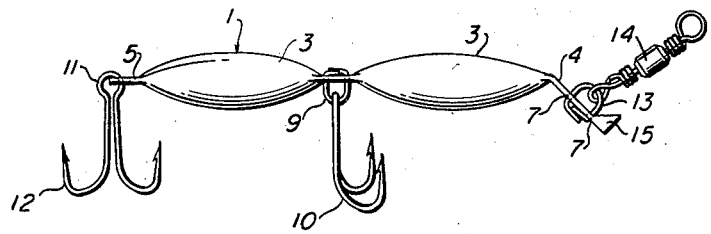
Figure 1 is a side elevational view of a fishing lure embodying my invention.

Referring in detail to the drawing, the improved fishing lure comprises an elongated body indicated generally at 1 formed of metal tubing and shaped to simulate the appearance of a small bait fish. The body may be formed from a piece of tubing of fairly soft thin walled metal cut to the length desired for the lure body. At a point substantially midway its ends, the length of tubing is pressed or pinched together in any suitable manner so as to collapse one side of the tubing against the other to form a flat autogenous weld portion 2 thereby forming a hollow substantially cylindrical chambered portion 3 at each side of the flat portion 2.

Figure 3:
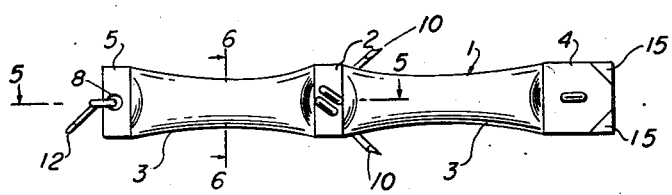
Figure 3 is a top plan view thereof.
Figure 5:
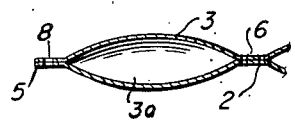
Figure 5 is a fragmentary sectional view taken on the plane of the line 5—5 of Figure 3.
Figure 6:
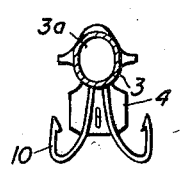
Figure 6 is a cross sectional view taken on the plane of the line 6—6 of Figure 3.
Figure 4:
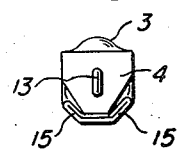
Figure 4 is an end view of the lure body looking from the right of Figure 1, certain attachments being omitted.

At one end, the material of the tubing is similarly pressed together to form a flat end portion 4 constituting the head of the lure body. The opposite end is similarly flattened to form a tail piece 5. The head 4 is preferably made longer than the tail piece 5 and is bent and inclined downwardly and forwardly and terminates below the bottom plane of the adjacent chambered portion 3 so that it extends below the surface of the water when the lure is floating thereon. It will be noted that the major axis or width of each flattened portion of the body extends transversely of the major axis of the adjacent chambered portion 3 so that the ends of the chambered portions 3 flare outwardly as best seen in Figure 3. The adhering sides of the tubing at the flattened portions ensure against leakage of water between said sides into the chambers 3a, thus making the chambers water-tight.

The intermediate flat portion 2 of the lure body and the head 4 are punched with a pair of holes 6 and 7, respectively, and the tail piece 5 is punched with a single hole 8. The holes 6 in the intermediate flat portion receive a wire loop 9, the ends of which are twisted and flattened against the flat portion, for swively supporting a gang hook 10. The hole in the tail piece 5 receives the loop portion 11 of a gang hook 12 whereby said hook is swively supported by the tail piece. A wire loop 13 is mounted in the holes in the head 4 similarly to the loop 9 for anchoring the end of a leader or fishing lure 14.

Figure 2:
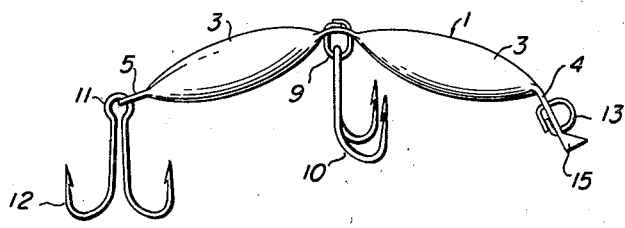
Figure 2 is a similar view but showing the chambered body sections bent at an angle to each other different from that shown in Figure 1.

The intermediate flat portion 2 of the lure body is manually bendable and in Figure 2 the chambered portions 3, 3 are shown bent and disposed at an angle to each other. It is this angular placement or positioning of the chambered portions 3, 3 relative to each other that is the controlling medium by which the wobbling, rolling and undulating actions or movements of the lure body in simulation of the swimming movements of a small bait fish is controlled in the water. The lure is operative when each of the chambered portions is disposed at an angle of from 5° to 37° to the horizontal, the lure having a sidewise horizontal movement when the angle is about 5°, and the action increases and changes from a side-to-side action to a rolling undulating or oscillating action about the longitudinal axis of the lure if the angular relation between the chambers and the horizontal increases. In practice, an angle of bend between 17° and 20° has been found very satisfactory, with an 18° bend preferable. Thus the fisherman may experiment and change the angle at will to produce the action that he desires.

When the fishing lure is cast, it drops upon the water with the projecting head 4 below the surface of the water. When the lure is pulled or trolled along or under the surface of the water, the projecting head 4 being below the surface causes the lure to dive and holds it down below the surface. The water hitting the projecting head 4 will cause the various movements of the lure body depending upon the angular position imparted to the chambered portions 3, 3. When the retrieving pull is released, the oscillating movements of the body will cease. During the retrieving movement of the lure body through the water, longitudinal spinning of the lure body is prevented by fins 15 formed on the head 4 by bending its corner edges.

The entire metal lure body is smoothly finished and provided with a plated finish producing a shiny attractive surface.

While I have illustrated and described the preferred embodiment of my invention, it is to be understood that changes in details might be made without departing from the principle of the invention and I desire therefore to be limited only by the state of the prior art and the appended claims.

What I claim as new and desire to secure by United States Letters Patent is:

1. A fishing lure comprising an elongated tubular metal body including a pair of aligned water-tight hollow chambered portions with a flat portion therebetween and with flat end portions, hook members supported from one of the flat end portions, and means on the other flat end portion for attaching a fishing line thereto, said flat portion between said chambered portions being bendable and providing for adjustment of the angular relation of said chambered portions.

2. A fish lure comprising an elongated metal body formed of a thin-walled tube of malleable metal that has portions of its wall flattened and welded together at both its ends and intermediate said ends, thereby providing a pair of substantially aligned hollow liquid-tight chambered portions with a flat portion between them and with flat end portions, means on one of said flat end portions for attaching a fishing line thereto, hook members connected to at least one of the other flat portions, said intermediate flat portion being bendable and providing for angular adjustment of each of said chambered portions relatively to the other chambered portion, the first-mentioned flat end portion being inclined downwardly and forwardly of the body below the plane of the body.

References Cited in the file of this patent

UNITED STATES PATENTS

| | | |
|---|---|---|
| 1,023,676 | Pancoast | Apr. 16, 1912 |
| 1,233,507 | Reynolds | July 17, 1917 |
| 1,352,054 | Dills | Sept. 7, 1920 |
| 1,777,004 | Lemere et al. | Sept. 30, 1930 |
| 2,183,849 | Swanberg | Dec. 19, 1939 |
| 2,459,959 | Pelmarsh | Jan. 25, 1949 |
| 2,645,052 | Schiller | July 14, 1953 |